(12) United States Patent
Dorfman et al.

(10) Patent No.: US 10,067,688 B2
(45) Date of Patent: Sep. 4, 2018

(54) STORAGE RESOURCE MANAGEMENT IN VIRTUALIZED ENVIRONMENTS

(71) Applicant: QUALCOMM Incorporated, San Diego, CA (US)

(72) Inventors: Konstantin Dorfman, Haifa (IL); Assaf Shacham, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 14/603,630

(22) Filed: Jan. 23, 2015

(65) Prior Publication Data

US 2016/0216898 A1   Jul. 28, 2016

(51) Int. Cl.
G06F 3/00 (2006.01)
G06F 3/06 (2006.01)

(52) U.S. Cl.
CPC ............ *G06F 3/0613* (2013.01); *G06F 3/061* (2013.01); *G06F 3/067* (2013.01); *G06F 3/0631* (2013.01); *G06F 3/0635* (2013.01); *G06F 3/0659* (2013.01); *G06F 3/0662* (2013.01); *G06F 3/0664* (2013.01); *G06F 3/0679* (2013.01)

(58) Field of Classification Search
None
See application file for complete search history.

(56) References Cited

U.S. PATENT DOCUMENTS 8,533,312 B2    9/2013  Thakur et al.
8,694,995 B2    4/2014  Cawlfield et al.
8,700,834 B2    4/2014  Horn et al.
8,799,605 B2    8/2014  Hasegawa
8,843,696 B2    9/2014  Hasegawa
(Continued)

FOREIGN PATENT DOCUMENTS

EP    2211262 A2    7/2010

OTHER PUBLICATIONS

International Search Report and Written Opinion for PCT/US2015/066676, dated Apr. 5, 2016, 12 pages.
(Continued)

*Primary Examiner* — David Yi
*Assistant Examiner* — Craig S Goldschmidt
(74) *Attorney, Agent, or Firm* — Withrow & Terranova, PLLC (57) ABSTRACT

Aspects disclosed in the detailed description include storage resource management in virtualized environments. In this regard, in one aspect, a virtualization layer is provided in a storage controller as an interface between one or more clients and a storage device. The storage controller is configured to trap storage resource requests from a client. A virtualized resource manager creates a virtual resource allocation that corresponds to a physical resource allocation in the storage device. The client receives the virtual resource allocation from the virtualization layer and subsequently accesses the virtual resource allocation through the storage controller as if the client were the sole user of the storage device. By trapping the storage resource requests at the storage controller and providing the virtual resource allocations to the one or more clients, it is possible to share compatibly the storage device among the one or more clients in a virtualized environment.

21 Claims, 6 Drawing Sheets

(56) References Cited

U.S. PATENT DOCUMENTS

| | | | |
|---|---|---|---|
| 8,843,933 B1 | 9/2014 | Holler et al. | |
| 9,286,079 B1* | 3/2016 | Roden | G06F 9/4401 |
| 2002/0007445 A1* | 1/2002 | Blumenau | G06F 3/0622 |
| | | | 711/153 |
| 2004/0085955 A1* | 5/2004 | Walter | H04L 63/0485 |
| | | | 370/386 |
| 2007/0245114 A1 | 10/2007 | Kakui et al. | |
| 2010/0161879 A1* | 6/2010 | Nation | G06F 12/0813 |
| | | | 711/103 |
| 2011/0276963 A1 | 11/2011 | Wu et al. | |
| 2012/0271615 A1* | 10/2012 | North | G06F 9/45516 |
| | | | 703/26 |
| 2012/0278525 A1* | 11/2012 | Serebrin | G06F 11/1451 |
| | | | 711/6 |
| 2013/0073793 A1* | 3/2013 | Yamagishi | G06F 13/16 |
| | | | 711/103 |
| 2013/0086352 A1 | 4/2013 | Annepu | |
| 2014/0082267 A1* | 3/2014 | Yoo | G06F 3/0656 |
| | | | 711/103 |

OTHER PUBLICATIONS

Stoess, Jan et al., "Energy Management for Hypervisor-Based Virtual Machines," Proceedings of the 2007 USENIX Annual Technical Conference, Jun. 17-22, 2007, Santa Clara, CA, 26 pages.
Second Written Opinion for PCT/US2015/066676, dated Dec. 16, 2016, 8 pages.
International Preliminary Report on Patentability for PCT/US2015/066676, dated May 29, 2017, 29 pages.

\* cited by examiner

FIG. 6

STORAGE RESOURCE MANAGEMENT IN VIRTUALIZED ENVIRONMENTS

BACKGROUND

I. Field of the Disclosure

The technology of the disclosure relates generally to universal flash storage (UFS) and embedded multimedia card (eMMC) storage devices.

II. Background

Universal flash storage (UFS) and embedded multimedia card (eMMC) are non-volatile storage devices commonly used in mobile computing devices, such as smart phones and tablet computers. UFS/eMMC storage devices are standardized by the Joint Electron Device Engineering Council (JEDEC), and support multiple commands with command queuing features to enable multi-thread programming paradigms. In this manner, the UFS/eMMC storage devices may provide improved random read/write access performance compared to conventional flash-based memory cards and embedded flash solutions, which process one command at a time.

UFS/eMMC storage devices are currently designed for management and usage by a single host software entity. However, many modern computing devices are capable of supporting multiple virtual clients (e.g., hosts or other processor subsystems) operating simultaneously using virtualized environments. In such virtualized environments, the multiple virtual clients may each interact with a virtual UFS/eMMC storage device as if it were the only client communicating with the UFS/eMMC storage device. Similarly, the UFS/eMMC storage device may operate as if it were communicating with only a single client, when, in fact, it is communicating with multiple virtual clients.

When the UFS/eMMC storage device is provided in a multi-client virtualized environment, communications among the multiple virtual clients and the UFS/eMMC storage device may require additional processing.

SUMMARY OF THE DISCLOSURE

Aspects disclosed in the detailed description include storage resource management in virtualized environments. In this regard, in one aspect, a virtualization layer is provided in a storage controller as an interface between one or more clients and a storage device. The storage controller is configured to trap storage resource requests from a client and provide the trapped storage resource requests to a virtualized resource manager through the virtualization layer. A virtualized resource manager creates a virtual resource allocation that corresponds to a physical resource allocation in the storage device. The client receives the virtual resource allocation from the virtualization layer and subsequently accesses the virtual resource allocation through the storage controller as if the client were the sole user of the storage device. In another aspect, the storage controller is configured to look up corresponding physical resource allocation addresses based on virtual resource allocation addresses provided by the one or more clients when the one or more clients access the storage device. By trapping the storage resource requests at the storage controller and providing the virtual resource allocations to the one or more clients, it is possible to share compatibly the storage device among the one or more clients in a virtualized environment.

In this regard, in one aspect, a storage controller for controlling a storage device is provided. The storage controller comprises a first host controller interface (HCI) coupled to a virtualized resource manager. The storage controller also comprises one or more second HCIs configured to be coupled to one or more clients, respectively. The storage controller also comprises a virtualization layer communicatively coupled to the first HCI and the one or more second HCIs. The storage controller is configured to trap a storage resource request received from a client among the one or more clients and provide the storage resource request to the virtualized resource manager. The virtualized resource manager is configured to create a virtual resource allocation for the client and map the virtual resource allocation to a physical resource allocation in the storage device. The virtualized resource manager is also configured to provide the virtual resource allocation and the physical resource allocation to the virtualization layer in a spoofed storage resource response. The virtualization layer is configured to record the virtual resource allocation and the physical resource allocation in a storage resource mapping table. The virtualization layer is also configured to provide the spoofed storage resource response comprising the virtual resource allocation to the client.

In another aspect, a means for controlling storage is provided. The means for controlling storage comprises a first HCI coupled to a means for allocating virtual resource. The means for controlling storage also comprises one or more second HCIs configured to be coupled to one or more clients, respectively. The means for controlling storage also comprises a means for virtualization communicatively coupled to the first HCI and the one or more second HCIs. The means for controlling storage is configured to trap a storage resource request received from a client among the one or more clients and provide the storage resource request to the means for allocating virtual resource. The means for allocating virtual resource is configured to create a virtual resource allocation for the client and map the virtual resource allocation to a physical resource allocation in a means for storage. The means for allocating virtual resource is also configured to provide the virtual resource allocation and the physical resource allocation to the means for virtualization in a spoofed storage resource response. The means for virtualization is configured to record the virtual resource allocation and the physical resource allocation in a storage resource mapping table. The means for virtualization is also configured to provide the spoofed storage resource response comprising the virtual resource allocation to the client.

In another aspect, a method for managing storage resources in a virtualized environment is provided. The method comprises trapping a storage resource request received from a client by a storage controller. The method also comprises providing the storage resource request to a virtualized resource manager. The method also comprises creating a virtual resource allocation for the client by the virtualized resource manager, wherein the virtual resource allocation corresponds to a physical resource allocation in a storage device coupled to the storage controller. The method also comprises mapping the virtual resource allocation to the physical resource allocation by the virtualized resource manager. The method also comprises providing the virtual resource allocation and an identity of the client to a virtualization layer comprised in the storage controller. The method also comprises generating a spoofed storage resource response by the virtualized resource manager, wherein the spoofed storage resource response comprises the virtual resource allocation. The method also comprises receiving the spoofed storage resource response and recording the virtual resource allocation and the physical resource allocation in a storage resource mapping table by the virtualization layer. The method also comprises providing the spoofed storage resource response to the client by the virtualization layer.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include storage resource management in virtualized environments. In this regard, in one aspect, a virtualization layer is provided in a storage controller as an interface between one or more clients and a storage device. The storage controller is configured to trap storage resource requests from a client and provide the trapped storage resource requests to a virtualized resource manager through the virtualization layer. A virtualized resource manager creates a virtual resource allocation that corresponds to a physical resource allocation in the storage device. The client receives the virtual resource allocation from the virtualization layer and subsequently accesses the virtual resource allocation through the storage controller as if the client were the sole user of the storage device. In another aspect, the storage controller is configured to look up corresponding physical resource allocation addresses based on virtual resource allocation addresses provided by the one or more clients when the one or more clients access the storage device. By trapping the storage resource requests at the storage controller and providing the virtual resource allocations to the one or more clients, it is possible to share compatibly the storage device among the one or more clients in a virtualized environment.

Figure 1:
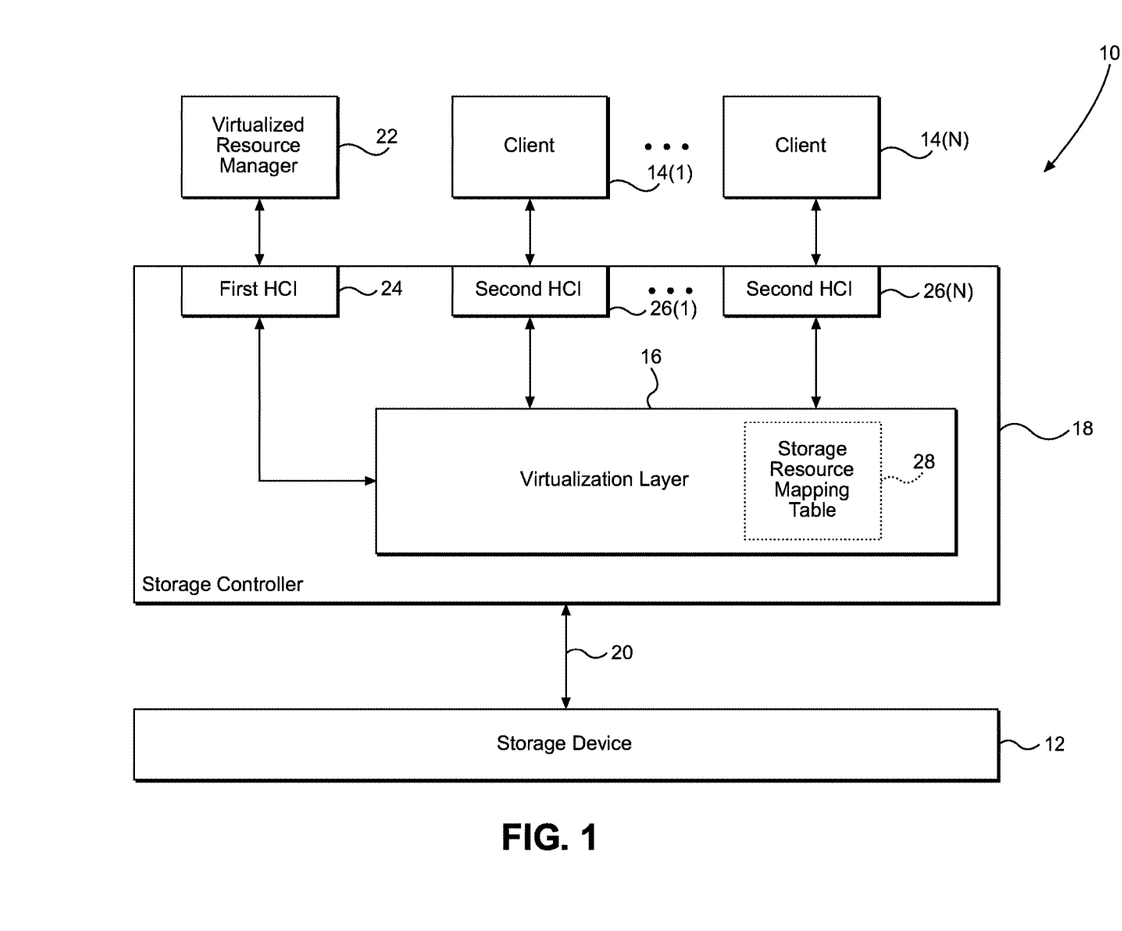
FIG. 1 is a schematic diagram of an exemplary virtualized storage system configured to share a storage device among one or more clients through a virtualization layer.

In this regard, FIG. 1 is a schematic diagram of an exemplary virtualized storage system 10 configured to share a storage device 12 among one or more clients 14(1)-14(N) through a virtualization layer 16. In an exemplary aspect, the virtualization layer 16 may be a Hypervisor. A storage controller 18, which includes the virtualization layer 16, is coupled to the storage device 12 via a communications medium 20. The storage controller 18 is coupled to a virtualized resource manager 22 via a first host controller interface (HCI) 24. The storage controller 18 comprises one or more second HCIs 26(1)-26(N) for coupling to the one or more clients 14(1)-14(N), respectively. In a non-limiting example, the virtualization layer 16 may be a hardware element or a software function. The first HCI 24 and the one or more second HCIs 26(1)-26(N) may be the same HCI, only labeled differently for the convenience of reference and discussion in the present disclosure.

With continuing reference to FIG. 1, in a non-limiting example, the storage device 12 may be a universal flash storage (UFS) or an embedded multimedia card (eMMC) that is currently designed for management and usage by a single client 14, which may be a host software entity. To be able to share the storage device 12 among the one or more clients 14(1)-14(N), the storage controller 18 is configured to trap a storage resource request (not shown) received from client 14 among the one or more clients 14(1)-14(N) and provide the trapped storage resource request to the virtualized resource manager 22. For example, if the storage device 12 is an eMMC, the trapped storage resource request may be an eMMC read command queue (CQ) depth command, which is trapped by the storage controller 18 at a CQ depth register (not shown). The CQ depth register is part of an extended (EXT) card specific data (CSD) (EXT_CSD) register (not shown) in the storage device 12. In another non-limiting example, if the storage device 12 is a UFS, the storage resource request may be a UFS logical unit report (REPORT_LUNS) command or a UFS logical unit inquiry (INQUIRY) command.

With continuing reference to FIG. 1, upon receiving the trapped storage resource request from the storage controller 18, the virtualized resource manager 22 creates a virtual resource allocation (not shown) that corresponds to a physical resource allocation (not shown) in the storage device 12. In a non-limiting example, the virtual resource allocation and the physical resource allocation are made in units of slots in the storage device 12. According to the non-limiting example, the particular client 14 among the one or more clients 14(1)-14(N) sending the storage resource request (hereinafter referred to as the "resource-requesting client") receives the physical resource allocation represented by a starting physical slot number (not shown) and a slot count (not shown), which indicate a number of consecutive physical slots (not shown) in the storage device 12 starting with the starting physical slot number. For example, if the starting physical slot number is five (5) and the slot count is three (3), the corresponding physical resource allocation comprises physical slots five (5), six (6), and seven (7). To keep track of the virtual resource allocation and the physical resource allocation for each of the one or more clients 14(1)-14(N), the virtualized resource manager 22 may be configured to map the virtual resource allocation to the physical resource allocation in a mapping mechanism (e.g., a mapping table).

With continuing reference to FIG. 1, after making the virtual resource allocation and the physical resource allocation for the resource-requesting client 14 among the one or more clients 14(1)-14(N), the virtualized resource manager 22 provides the virtual resource allocation and an identity of the resource-requesting client 14 among the one or more clients 14(1)-14(N) to the virtualization layer 16 in a spoofed storage resource response (not shown). Subsequently, the virtualization layer 16 provides the spoofed storage resource response, which comprises the virtual resource allocation received from the virtualized resource manager 22, to the resource-requesting client 14 among the one or more clients 14(1)-14(N). Although the resource-requesting client 14 among the one or more clients 14(1)-14(N) may have only been allocated a portion of the total storage space in the storage device 12, the resource-requesting client 14 among the one or more clients 14(1)-14(N) is nonetheless "fooled" by the spoofed storage resource response to believe that no other client 14 among the one or more clients 14(1)-14(N) is sharing the storage device 12. Furthermore, none of the one or more clients 14(1)-14(N) will ever find out the total storage space in the storage device 12 because all the storage resource requests are trapped at the storage controller 18. As a result, it is possible to share the storage device 12 among the one or more clients 14(1)-14(N) in the virtualized storage system 10.

With continuing reference to FIG. 1, the virtualization layer 16 may record the virtual resource allocation and the physical resource allocation in a storage resource mapping table 28 that comprises one or more mapping entries. In a non-limiting example, the storage resource mapping table 28 may be provided as a software function and may reside inside or outside the virtualization layer 16. The storage resource mapping table 28 comprises a mapping entry for each resource-requesting client 14 among the one or more clients 14(1)-14(N). Table 1 below illustrates an exemplary structure of the mapping entry.

TABLE 1

| Mapping Entry Structure | | | |
|---|---|---|---|
| Client Identification | Tag | Starting Physical Slot | Slot Count |

As illustrated in Table 1 above, the mapping entry in the storage resource mapping table 28 comprises a Client Identification field, a Tag field, a Starting Physical Slot field, and a Slot Count field. The Client Identification field indicates an identity of the resource-requesting client 14 among the one or more clients 14(1)-14(N). The Tag field indicates a starting virtual slot number in the virtual resource allocation. The Starting Physical Slot field indicates a starting physical slot number in the physical resource allocation. The Slot Count field indicates the number of consecutive physical slots, which starts with the starting physical slot number, allocated to the resource-requesting client 14 among the one or more clients 14(1)-14(N) in the physical allocation in the storage device 12. The starting virtual slot number in the Tag field may be the same as or different from the starting physical slot number in the Starting Physical Slot field. For example, the starting virtual slot number may be zero (0) while the starting physical slot number is five (5).

With continuing reference to FIG. 1, a client 14 among the one or more clients 14(1)-14(N) can access the virtual resource allocation by sending a storage resource access request (not shown) to the virtualization layer 16 in the storage controller 18. The client 14 among the one or more clients 14(1)-14(N) sending the storage resource access request is hereinafter referred to as the "access-requesting client" for the convenience of discussion. The storage resource access request comprises a virtual slot number which the access-requesting client 14 among the one or more clients 14(1)-14(N) intends to access. Upon receiving the storage resource access request, the virtualization layer 16 in the storage controller 18 looks up a corresponding physical slot number in the storage resource mapping table 28 based on the virtual slot number. In a non-limiting example, the mapping entry for the access-requesting client 14 among the one or more clients 14(1)-14(N) in the storage resource mapping table 28 has the following values:

Client Identification field=1
Tag field=0
Starting Physical Slot Number=5
Slot Count=3

According to the above non-limiting example, if the storage resource access request comprises the virtual slot number two (2), which is the virtual slot the access-requesting client 14 among the one or more clients 14(1)-14(N) intends to access, the corresponding physical slot number will be seven (7) (The corresponding physical slot number= ((the virtual slot number in the storage resource access request)−(Tag)+(Starting Physical Slot Number))=2−0+5=7).

With continuing reference to FIG. 1, the storage controller 18 then provides at least one storage resource access instruction (not shown), which comprises the corresponding physical slot number, to the storage device 12 for carrying out the storage resource access request of the access-requesting client 14 among the one or more clients 14(1)-14(N). Upon receiving storage resource access results (not shown) from the storage device 12, the storage controller 18 provides the storage resource access results to the access-requesting client 14 among the one or more clients 14(1)-14(N).

To further illustrate the virtual resource allocation and access described above with reference to FIG. 1, FIGS. 2-5 are provided and discussed next. Elements in FIG. 1 are referenced in connection to FIGS. 2-5 and will not be re-described herein.

Figure 2:
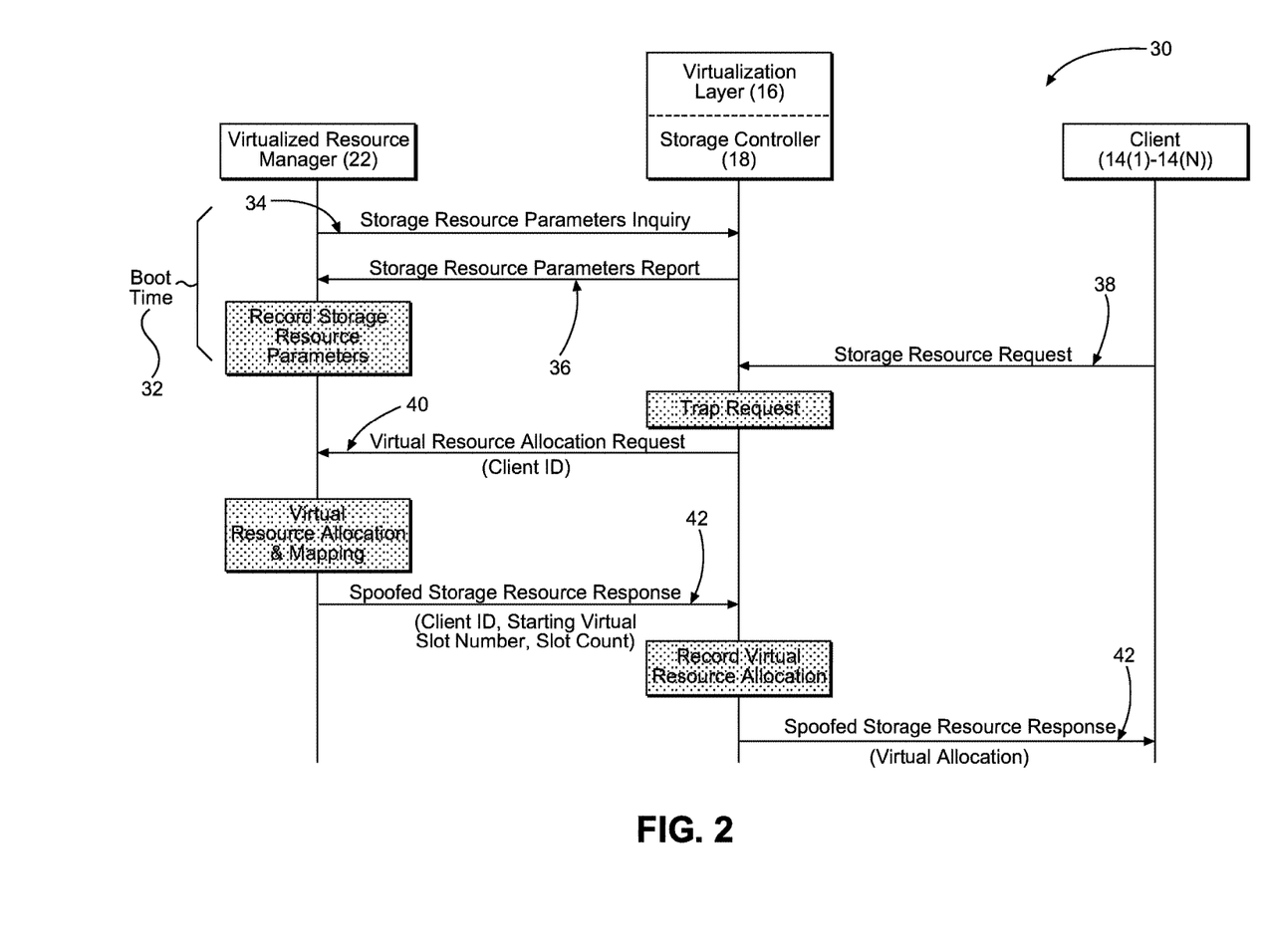
FIG. 2 illustrates an exemplary storage resource allocation signaling flow for one or more clients to request storage resources in a storage device.

In this regard, FIG. 2 illustrates an exemplary storage resource allocation signaling flow 30 for the one or more clients 14(1)-14(N) to request storage resources in the storage device 12. During a boot time 32 wherein the virtualized storage system 10 is starting up, the virtualized resource manager 22 is configured to send a storage resource parameters inquiry 34 to the storage device 12 via the storage controller 18 to request one or more storage resource parameters (not shown) related to the storage device 12. In response, the storage device 12 sends a storage resource parameters report 36 via the storage controller 18. The storage resource parameters report 36 comprises the one or more storage resource parameters related to the storage device 12. The virtualized resource manager 22, in turn, may be configured to record the one or more storage resource parameters.

With continuing reference to FIG. 2, to request storage resources, the one or more clients 14(1)-14(N) may each send a storage resource request 38 to the storage controller 18. The storage controller 18 traps the storage resource request 38 received from the resource-requesting client 14 (trapped storage resource request 38) among the one or more clients 14(1)-14(N). Subsequently, the storage controller 18 provides the trapped storage resource request 38 to the virtualized resource manager 22 in a virtual resource allocation request 40 that further comprises identification of the resource-requesting client 14 among the one or more clients 14(1)-14(N) (Client ID). The virtualized resource manager 22 creates a virtual resource allocation for the resource-requesting client 14 among the one or more clients 14(1)-14(N), wherein the virtual resource allocation corresponds to a physical resource allocation in the storage device 12. The virtualized resource manager 22 then generates a spoofed storage resource response 42 comprising the identification of the resource-requesting client 14 among the one or more clients 14(1)-14(N) (Client ID), the starting virtual slot number, and the number of slots allocated to the resource-requesting client 14 among the one or more clients 14(1)-14(N) (Slot Count). Upon receiving the spoofed storage resource response 42, the virtualization layer 16 may record virtual resource allocation parameters in the storage resource mapping table 28. The virtualization layer 16 in turn provides the spoofed storage resource response 42, which comprises the Client ID, the starting virtual slot number, and the Slot Count, to the resource-requesting client 14 among the one or more clients 14(1)-14(N). Because the storage resource request 38 is trapped at the storage controller 18, the resource-requesting client 14 among the one or more clients 14(1)-14(N) may be "fooled" by the spoofed storage resource response 42 to believe that the resource-requesting client 14 among the one or more clients 14(1)-14(N) is the sole user of the storage device 12. Hence, by repeating the storage resource allocation signaling flow 30 for each of the one or more clients 14(1)-14(N), it is possible to share the storage device 12 among the one or more clients 14(1)-14(N) in the virtualized storage system 10.

Figure 3:
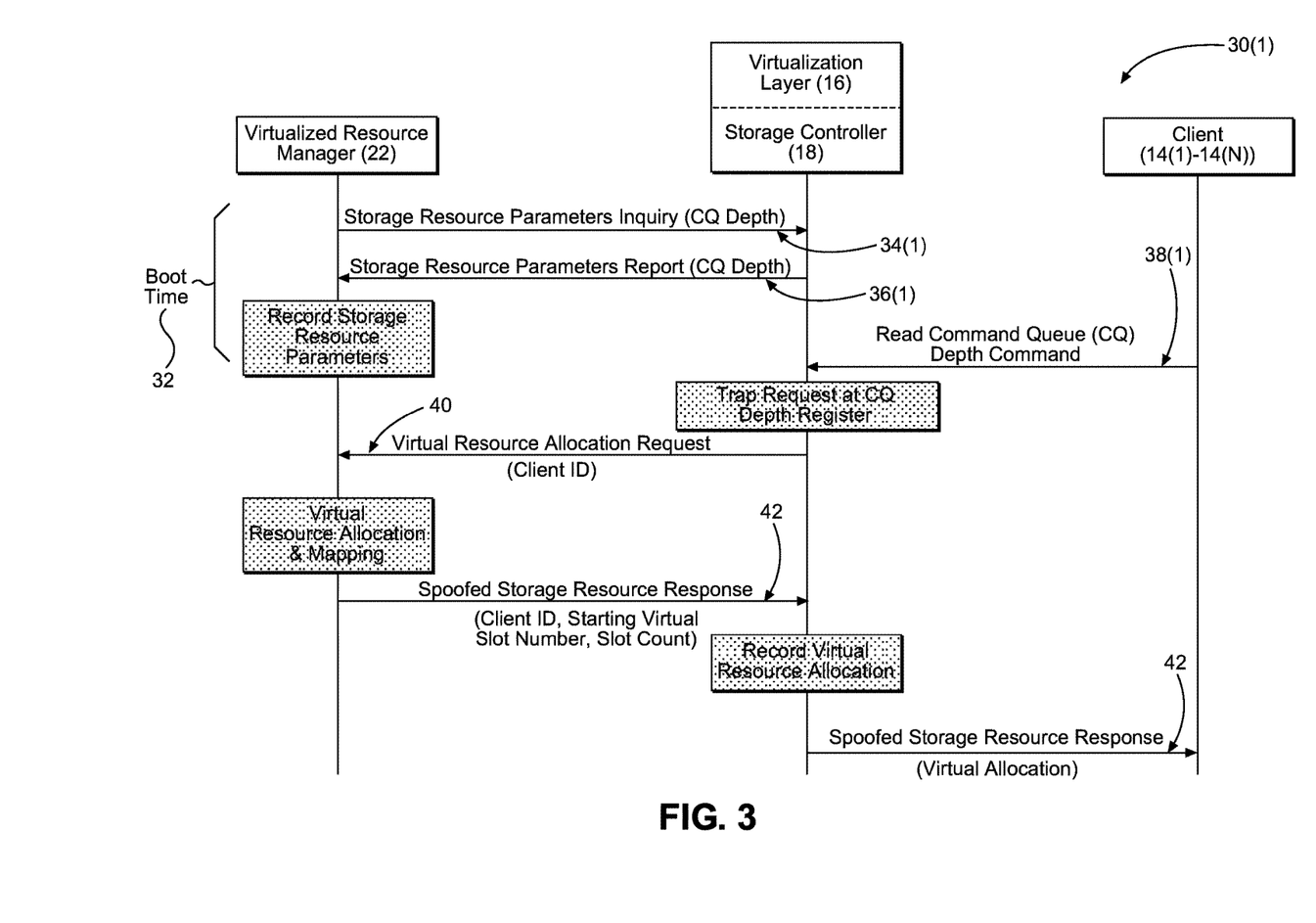
FIG. 3 illustrates an exemplary embedded multimedia card (eMMC) storage resource allocation signaling flow for one or more clients to request storage resources in an eMMC storage device.

As mentioned above, the storage device 12 may be an eMMC or a UFS. In this regard, FIG. 3 illustrates an exemplary eMMC storage resource allocation signaling flow 30(1) for the one or more clients 14(1)-14(N) to request storage resources in the storage device 12 that is an eMMC. Common elements between FIG. 2 and FIG. 3 are shown with common element numbers, and thus will not be re-described herein.

With regard to FIG. 3, during the boot time 32, the virtualized resource manager 22 may inquire about eMMC-specific storage resource parameters (e.g., CQ depth) in a storage resource parameters inquiry 34(1) and receive the eMMC-specific storage resource parameters in a storage resource parameters report 36(1). The virtualized resource manager 22 subsequently records the eMMC-specific storage access parameters. The one or more clients 14(1)-14(N), in turn, may request for eMMC storage resources by sending an eMMC read CQ depth command 38(1) to the storage controller 18. The storage controller 18 traps the eMMC read CQ depth command 38(1) at a CQ depth register (not shown) in an EXT_CSD register (not shown) in the storage device 12.

Figure 4:
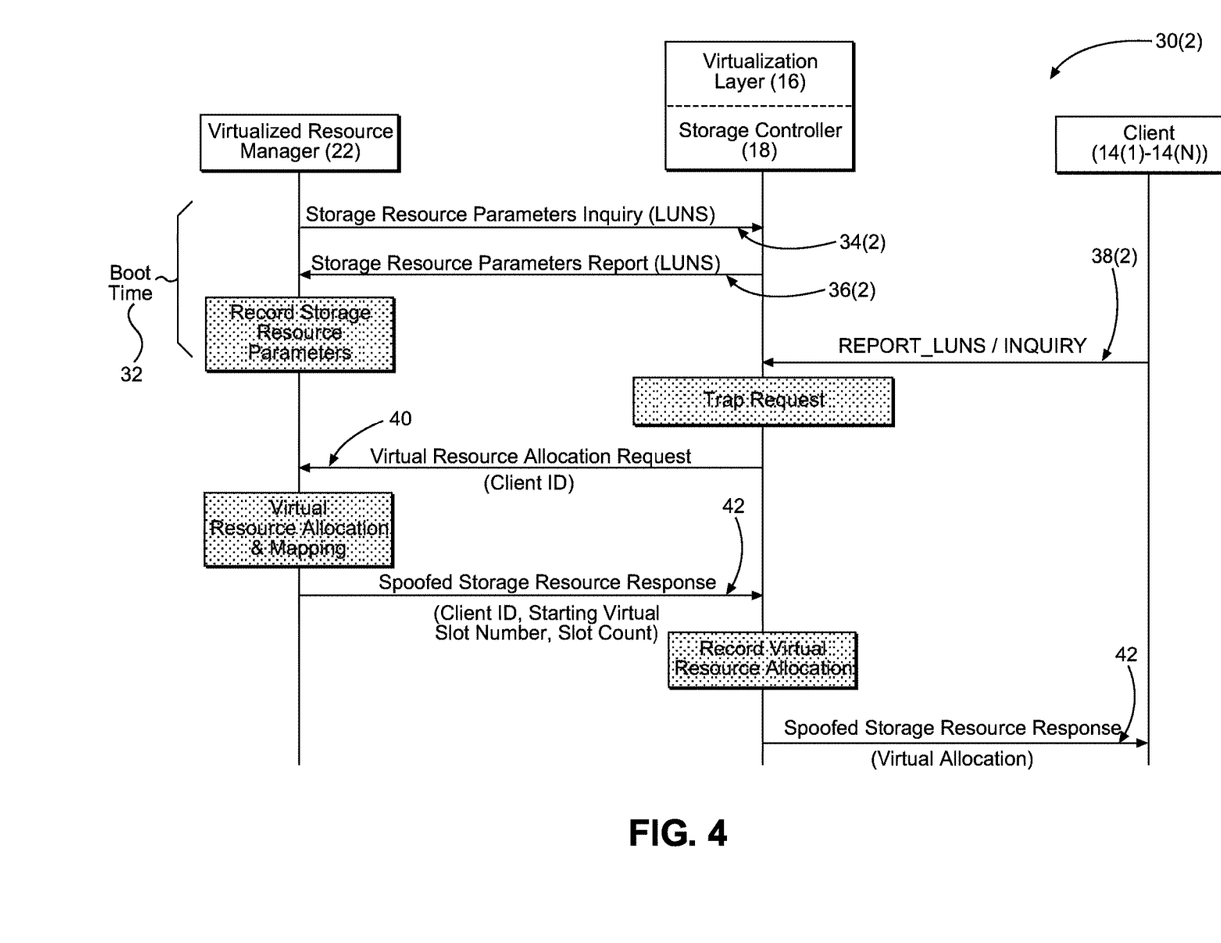
FIG. 4 illustrates an exemplary universal flash storage (UFS) storage resource allocation signaling flow for one or more clients to request storage resources in a UFS storage device.

FIG. 4 illustrates an exemplary UFS storage resource allocation signaling flow 30(2) for the one or more clients 14(1)-14(N) to request storage resources in the storage device 12 that is a UFS. Common elements between FIG. 2 and FIG. 4 are shown with common element numbers, and thus will not be re-described herein.

With regard to FIG. 4, during the boot time 32, the virtualized resource manager 22 may inquire about UFS-specific storage resource parameters (e.g., logical units (LUNS)) in a storage resource parameters inquiry 34(2) and receive the UFS-specific storage resource parameters in a storage resource parameters report 36(2). The storage controller 18 subsequently records the UFS-specific storage resource parameters. The one or more clients 14(1)-14(N), in turn, may request UFS storage resources by sending a UFS logical unit report (REPORT_LUNS) command 38(2) or a UFS INQUIRY command 38(2) to the storage controller 18.

Figure 5:
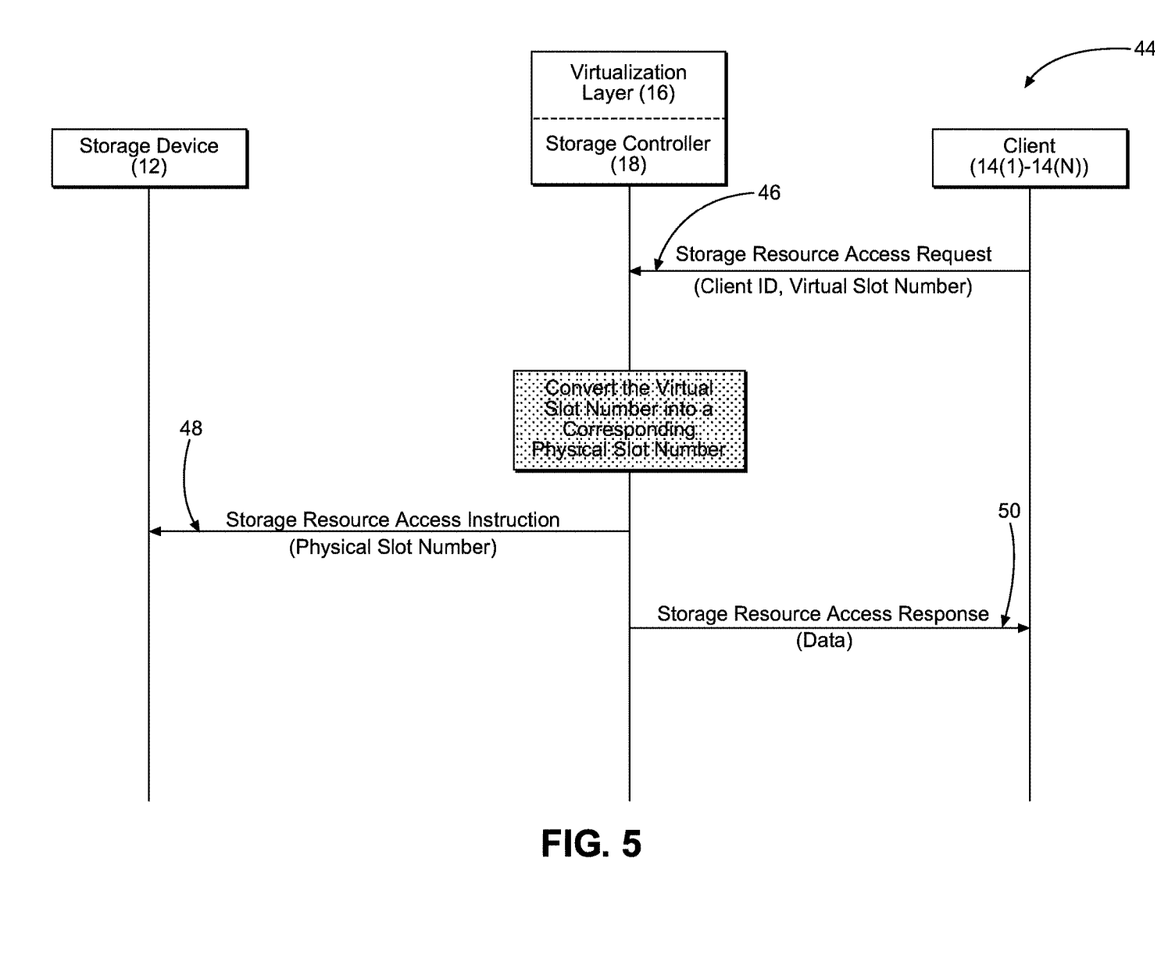
FIG. 5 illustrates an exemplary storage resource access signaling flow for one or more clients to access storage resources in a storage device.

Each of the one or more clients 14(1)-14(N) may access respective virtual resource allocation through the storage controller 18. In this regard, FIG. 5 illustrates an exemplary storage resource access signaling flow 44 for the one or more clients 14(1)-14(N) to access storage resources in the storage device 12. To access the storage resources, the access-requesting client 14 among the one or more clients 14(1)-14(N) sends a storage resource access request 46 to the storage controller 18. The storage resource access request 46 comprises the identification of the access-requesting client 14 among the one or more clients 14(1)-14(N) (Client ID) and the virtual slot number the access-requesting client 14 among the one or more clients 14(1)-14(N) intends to access. As previously discussed in FIG. 1, the storage controller 18 looks up a corresponding physical slot number in the storage resource mapping table 28 based on the virtual slot number. The storage controller 18 then provides the corresponding physical slot number to the storage device 12 via at least one storage resource access instruction 48 for carrying out the storage resource access request 46 of the access-requesting client 14 among the one or more clients 14(1)-14(N). Subsequently, the storage controller 18 provides storage resource access results to the access-requesting client 14 among the one or more clients 14(1)-14(N) via a storage resource access response 50. In this regard, the one or more clients 14(1)-14(N) can share compatibly the storage device 12.

Storage resource management in virtualized environments may be provided in or integrated into any processor-based device. Examples, without limitation, include: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, a threshold logic circuit, and a logic process circuit.

Figure 6:
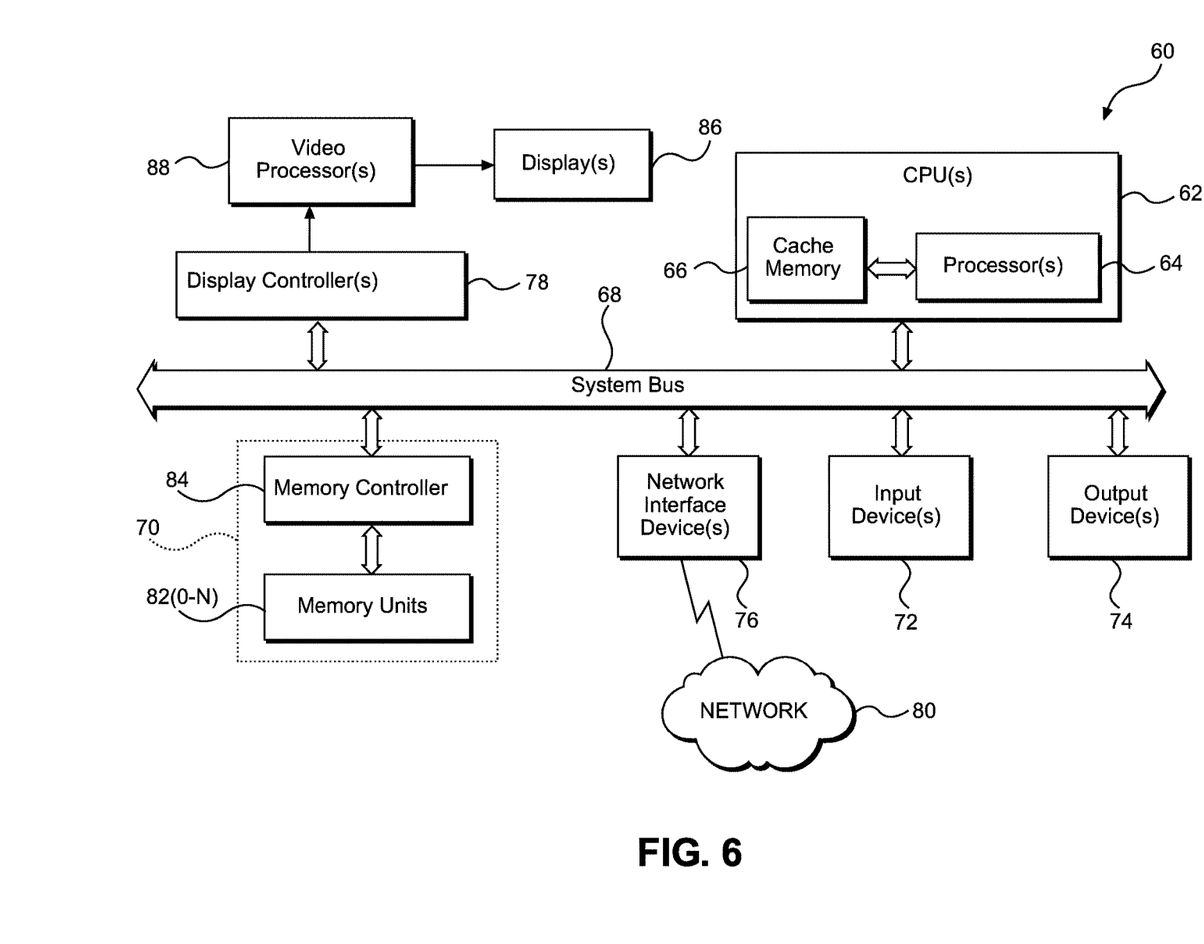
FIG. 6 is a block diagram of an exemplary processor-based system that can include the virtualized storage system in FIG. 1 configured to share a storage device among one or more clients through the virtualization layer in FIG. 1.

In this regard, FIG. 6 is a block diagram of an exemplary processor-based system 60 that can include the virtualized storage system 10 in FIG. 1 configured to share the storage device 12 among the one or more clients 14(1)-14(N) through the virtualization layer 16 in FIG. 1.

In this example, the processor-based system 60 includes one or more central processing units (CPUs) 62, each including one or more processors 64. The CPU(s) 62 may have cache memory 66 coupled to the processor(s) 64 for rapid access to temporarily stored data. The CPU(s) 62 is coupled to a system bus 68 and can inter-couple devices included in the processor-based system 60. As is well known, the CPU(s) 62 communicates with these other devices by exchanging address, control, and data information over the system bus 68. Although not illustrated in FIG. 6, multiple system buses 68 could be provided, wherein each system bus 68 constitutes a different fabric.

Other devices can be connected to the system bus 68. As illustrated in FIG. 6, these devices can include a memory system 70, one or more input devices 72, one or more output devices 74, one or more network interface devices 76, and one or more display controllers 78, as examples. The input device(s) 72 can include any type of input device, including but not limited to: input keys, switches, voice processors, etc. The output device(s) 74 can include any type of output device, including but not limited to: audio, video, other visual indicators, etc. The network interface device(s) 76 can be any device configured to allow exchange of data to and from a network 80. The network 80 can be any type of network, including but not limited to: a wired or wireless network, a private or public network, a local area network (LAN), a wireless local area network (WLAN), a wireless wide area network (WWAN), a Bluetooth piconet, or the Internet. The network interface device(s) 76 can be configured to support any type of communications protocol desired. The memory system 70 can include one or more memory units 82(0-N) and memory controller 84.

The CPU(s) 62 may also be configured to access the display controller(s) 78 over the system bus 68 to control information sent to one or more displays 86. The display controller(s) 78 sends information to the display(s) 86 to be displayed via one or more video processors 88, which process the information to be displayed into a format suitable for the display(s) 86. The display(s) 86 can include any type of display, including but not limited to: a cathode ray tube (CRT), a light emitting diode (LED) display, a liquid crystal display (LCD), a plasma display, etc.

The processor-based system 60 may be configured to support the virtualized storage system 10 in FIG. 1. In this regard, the CPU(s) 62 may be configured to function as the virtualization layer 16 and provide a means for virtualization. The CPU(s) 62 may be configured to function as the virtualized resource manager 22 and provide a means for allocating virtual resource. The input device(s) 72, the output device(s) 74, the network interface device(s) 76, and the display controller(s) 78 are among the one or more clients 14(1)-14(N). The one or more memory units 82(0-N), which may be eMMC or UFS, can be configured to function as the storage device 12 and provide a means for storage. The memory controller 84 may function as the storage controller 18 and provide a means for controlling storage. As such, it is possible to share the one or more memory units 82(0-N) among the input device(s) 72, the output device(s) 74, the network interface device(s) 76, and the display controller(s) 78 through virtualization provided by the CPU(s) 62.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A storage controller for controlling a storage device, comprising:
   a first host controller interface (HCI) coupled to a virtualized resource manager;
   one or more second HCIs configured to be coupled to one or more clients, respectively; and
   a virtualization layer communicatively coupled to the first HCI and the one or more second HCIs;
   wherein the storage controller is configured to trap a storage resource request received from a client among the one or more clients and provide the storage resource request to the virtualized resource manager; and
   wherein the virtualization layer is configured to:
      receive a virtual resource allocation for the client and a physical resource allocation in the storage device in a spoofed storage resource response;

record the virtual resource allocation and the physical resource allocation in a storage resource mapping table; and provide the spoofed storage resource response comprising the virtual resource allocation to the client, wherein the spoofed storage resource response is configured to fool the client to believe that no other client among the one or more clients is sharing the storage device.

2. The storage controller of claim 1, wherein the virtualization layer is a Hypervisor.

3. The storage controller of claim 1, wherein the storage device is an embedded multimedia card (eMMC).

4. The storage controller of claim 3, wherein the storage resource request is provided as an eMMC read command queue (CQ) depth command.

5. The storage controller of claim 4, wherein the eMMC read CQ depth command is trapped by the storage controller at a CQ depth register in an extended (EXT) card specific data (CSD) (EXT_CSD) register comprised in the storage device.

6. The storage controller of claim 3, wherein the virtualized resource manager is configured to:
request one or more storage resource parameters from the storage controller at a boot time;
receive a storage resource parameters report from the storage controller, wherein the storage resource parameters report comprises an eMMC command queue (CQ) depth; and
record the one or more storage resource parameters.

7. The storage controller of claim 1, wherein the storage device is a universal flash storage (UFS).

8. The storage controller of claim 7, wherein the storage resource request is provided as a UFS logical unit report (REPORT_LUNS) command.

9. The storage controller of claim 7, wherein the storage resource request is provided as a UFS INQUIRY command.

10. The storage controller of claim 7, wherein the virtualized resource manager is configured to:
request one or more storage resource parameters from the storage controller at a boot time;
receive a storage resource parameters report from the storage controller, wherein the storage resource parameters report comprises UFS logical units (LUNS); and
record the one or more storage resource parameters.

11. The storage controller of claim 1, wherein the virtualization layer is comprised in a hardware element or in a software function.

12. The storage controller of claim 1, wherein the storage resource mapping table comprises one or more mapping entries, wherein each of the one or more mapping entries corresponds to a respective client and further comprises:
a client identification field indicating an identity of the respective client;
a tag field indicating a starting virtual slot number in the virtual resource allocation;
a starting physical slot field indicating a starting physical slot number in the physical resource allocation; and
a slot count field indicating a number of consecutive physical slots, which starts with the starting physical slot number, allocated to the respective client in the physical resource allocation.

13. The storage controller of claim 12, wherein:
the virtualization layer is further configured to:
receive a storage resource access request from the respective client, wherein the storage resource access request comprises a virtual slot number; and
look up a corresponding physical slot number in the storage resource mapping table based on the virtual slot number; and
the storage controller is further configured to:
provide at least one storage resource access instruction to the storage device, wherein the at least one storage resource access instruction comprises the corresponding physical slot number; and
receive and provide storage resource access results to the respective client.

14. The storage controller of claim 1, wherein the virtualized resource manager is configured to:
create the virtual resource allocation for the client and map the virtual resource allocation to the physical resource allocation in the storage device; and
provide the virtual resource allocation and the physical resource allocation to the virtualization layer in the spoofed storage resource response.

15. A means for controlling storage, comprising:
a first host controller interface (HCI) coupled to a means for allocating virtual resource;
one or more second HCIs configured to be coupled to one or more clients, respectively; and
a means for virtualization communicatively coupled to the first HCI and the one or more second HCIs;
wherein the means for controlling storage is configured to trap a storage resource request received from a client among the one or more clients and provide the storage resource request to the means for allocating virtual resource; and
wherein the means for virtualization is configured to:
receive a virtual resource allocation for the client and a physical resource allocation in a storage device in a spoofed storage resource response;
record the virtual resource allocation and the physical resource allocation in a storage resource mapping table; and
provide the spoofed storage resource response comprising the virtual resource allocation to the client, wherein the spoofed storage resource response is configured to fool the client to believe that no other client among the one or more clients is sharing the storage device.

16. A method for managing storage resources in a virtualized environment, comprising:
trapping a storage resource request received from a client by a storage controller;
providing the storage resource request to a virtualized resource manager;
creating a virtual resource allocation for the client by the virtualized resource manager, wherein the virtual resource allocation corresponds to a physical resource allocation in a storage device coupled to the storage controller;
mapping the virtual resource allocation to the physical resource allocation by the virtualized resource manager;
providing the virtual resource allocation and an identity of the client to a virtualization layer comprised in the storage controller;
generating a spoofed storage resource response by the virtualized resource manager, wherein the spoofed storage resource response comprises the virtual resource allocation;
receiving the spoofed storage resource response and recording the virtual resource allocation and the physical resource allocation in a storage resource mapping table by the virtualization layer; and providing the spoofed storage resource response to the client by the virtualization layer wherein the spoofed storage resource response is configured to fool the client to believe that no other client is sharing the storage device.

17. The method of claim 16, wherein trapping the storage resource request received from the client comprises trapping an embedded multimedia card (eMMC) read command queue (CQ) depth command.

18. The method of claim 16, wherein trapping the storage resource request received from the client comprises trapping a universal flash storage (UFS) logical unit report (REPORT_LUNS) command.

19. The method of claim 16, wherein trapping the storage resource request received from the client comprises trapping a universal flash storage (UFS) INQUIRY command.

20. The method of claim 16, further comprising:

receiving a storage resource access request from the client, wherein the storage resource access request comprises a virtual slot number;

generating a corresponding physical slot number based on the virtual slot number and the storage resource mapping table;

providing at least one storage resource access instruction to the storage device, wherein the at least one storage resource access instruction comprises the corresponding physical slot number; and receiving and providing storage resource access results to the client.

21. The method of claim 16, wherein mapping the virtual resource allocation to the physical resource allocation comprises adding a mapping entry to the storage resource mapping table, wherein the mapping entry comprises:

a client identification field indicating an identity of a respective client;

a tag field indicating a starting virtual slot number in the virtual resource allocation;

a starting physical slot field indicating a starting physical slot number in the physical resource allocation; and a slot count field indicating a number of consecutive physical slots, which starts with the starting physical slot number, allocated to the respective client in the physical resource allocation.

* * * * *